May 3, 1966  S. E. CORRY  3,248,794
SPOTTER DEVICE FOR VEHICLES
Filed April 29, 1963  3 Sheets-Sheet 1
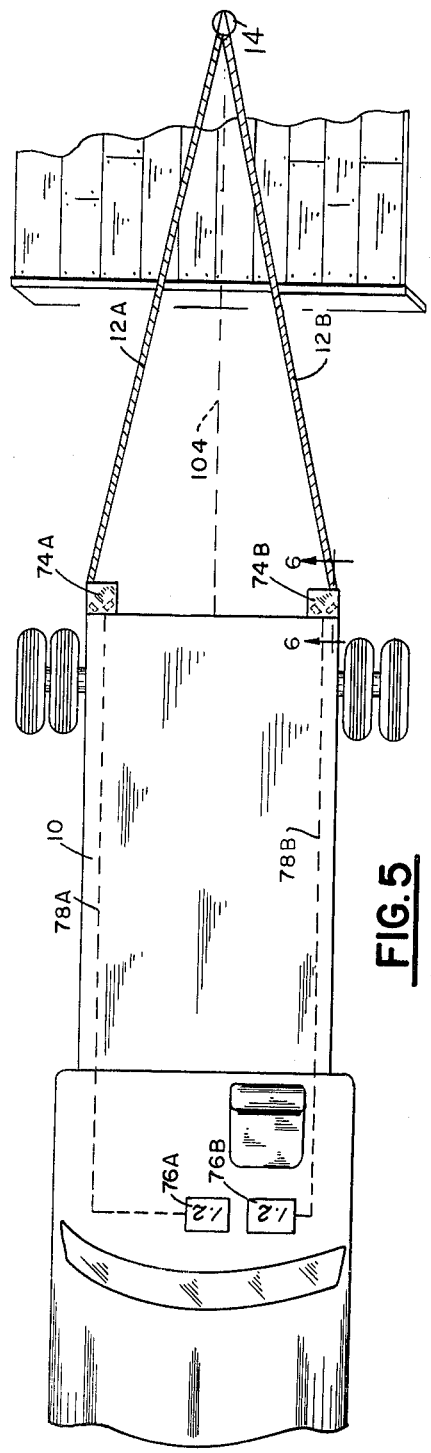
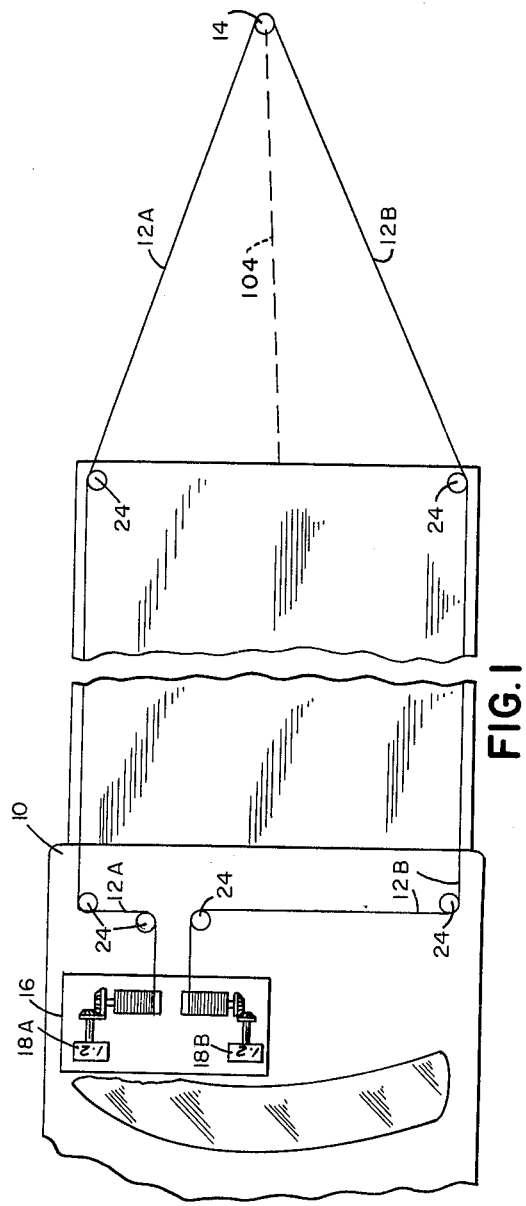
INVENTOR.
STUART E. CORRY
BY
Head & Johnson
ATTORNEYS May 3, 1966  S. E. CORRY  3,248,794
SPOTTER DEVICE FOR VEHICLES
Filed April 29, 1963  3 Sheets-Sheet 2

INVENTOR.
STUART E. CORRY

BY *Head & Johnson*

ATTORNEYS

May 3, 1966 S. E. CORRY 3,248,794
SPOTTER DEVICE FOR VEHICLES
Filed April 29, 1963 3 Sheets-Sheet 3

INVENTOR.
STUART E. CORRY
BY
*Head & Johnson*
ATTORNEYS

United States Patent Office 3,248,794
Patented May 3, 1966

3,248,794
SPOTTER DEVICE FOR VEHICLES
Stuart E. Corry, 4605 S. Evanston, Tulsa, Okla.
Filed Apr. 29, 1963, Ser. No. 276,535
5 Claims. (Cl. 33—125)

This invention relates to a spotter device for vehicles. More particularly, the invention relates to a device for use on a vehicle to enable the driver to back the vehicle to a predetermined point.

A problem drivers have is that of backing the truck to a place where it is needed. A specific example of this problem exists in the oil industry and particularly on trucks carrying work-over rigs. When a well is to be worked on, the truck bearing the rig must back to an exact spot so that when the rig is set up it will stand directly over the well to be serviced. The operator of the truck frequently cannot see from his driving position the well casing to which he must accurately rearwardly position his truck in order for the mast or other work-over equipment to be properly positioned.

It is therefore an object of this invention to provide a spotter for use on vehicles, such as trucks, to provide the driver with information to enable him to back the vehicle accurately to a predetermined position.

Another object of this invention is to provide a spotter for use on vehicles to enable the driver to accurately back the vehicle to a predetermined position including simple, straight forward and inexpensive means of providing necessary directional information to the driver.

These and other objects and a better understanding of the invention may be had by referring to the following description and claims taken in conjunction with the attached drawings in which:

FIGURE 1 is a diagrammatic view of a truck vehicle taken from above the vehicle showing the basic components of this invention arranged on the vehicle.

FIGURE 5 is a diagrammatic view of a vehicle utilizing an alternate spotter system of this invention.

Referring first to FIGURE 1, the device of this invention is shown mounted on a truck generally indicated by the numeral 10. Extending from both the right and left rearward extremities of the truck 10 are cables 12A and 12B which are affixed to some object 14, representing the spot to which accurate rearward positioning of the truck is required. Cables 12A and 12B may be one looped cable extending around the object 14. The cables 12A and 12B extend from the rearward portions of the truck to an indicating panel 16 mounted in the cab of the truck. Positioned in the indicating panel are two counters 18A and 18B which display numbers indicating the length of cables 12A and 12B extending from the rearward portion of the truck, the indicating panel 16 being so positioned that the counters 18A and 18B may be readily viewed by the operator of the truck.

Figure 2:
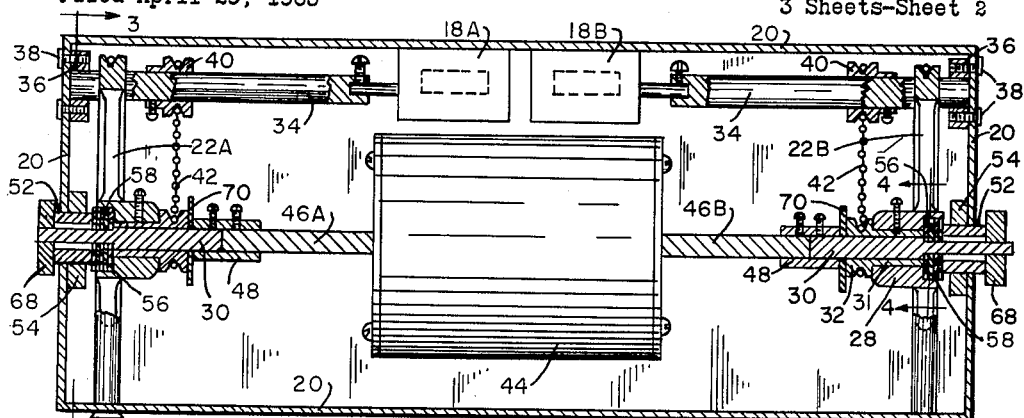
FIGURE 2 is a cross-sectional view of a panel as utilized in the arrangement of FIGURE 1 having means of visually indicating to a truck driver his position relative to a predetermined spot.

Referring to FIGURE 2, the indicating panel 16 is shown in more detail. The panel 16 is preferably an enclosure formed by a frame 20 which serves as a housing to protect the elements of the device from physical injury and also as a structure in which the elements of the device are positioned. Rotatably supported within the housing 20 is a first reel 22A and a second reel 22B. Reel 22A receives cable 12A and reel 22B receives cable 12B. Although a variety of cables may be utilized, a preferred embodiment includes the use of ball or bead measuring chain, that is, small metallic hollow balls formed about inter-connecting links of wire. Such type of chain is highly flexible and relatively inexpensive, and reels 22A and 22B can be so provided with peripheries to receive such type of ball chain without any slippage. As shown in FIGURE 1, pulleys 24 are provided as a means of extending the cables 12A and 12B from the rearward to the forward portion of the truck. A preferred embodiment, however, includes the use of flexible tubing, such as copper tubing, receiving the cables 12. In this manner the tubing may be easily bent to guide the chain from the rearward portions of the truck to the indicating panel 16 without requiring the mounting of any type of pulley or other guide means to the truck.

Hub 28 of each reel 22A and 22B is supported about a tubular extension 31 of a counter drive sprocket 32 and is held in fixed relationship with the counter drive sprocket with bolt 33. A pulley shaft 30 rotatably receives and supports the counter drive sprocket 32 and thereby the reel 22A or 22B. Extending from each of the counters 18A and 18B is a counter shaft 34 which is rotatably supported at one end by a bearing collar 36, which in turn is supported to the housing 20 by bolts 38. Affixed to the counter shaft 34 is a counter shaft sprocket 40. A counter chain 42 couples the counter drive sprocket 32 with the counter shaft sprocket 40. The rotation of reel 22A as cable 12A is extracted from or withdrawn into the truck rotates the counter 18A by means of counter drive sprocket 32, counter chain 42 and counter shaft sprocket 40, providing a visual indication of the length of cable 12A extending from the truck. In the same manner the length of cable 12B extending from the truck is visually indicated on counter 18B.

Figure 4:
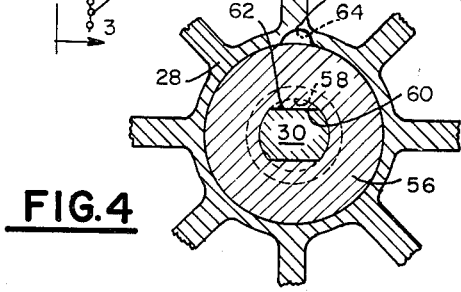
FIGURE 4 is a greatly enlarged cross-sectional view taken along the line 4—4 of FIGURE 2 showing the slip clutch arrangement of the invention.
Figure 9:
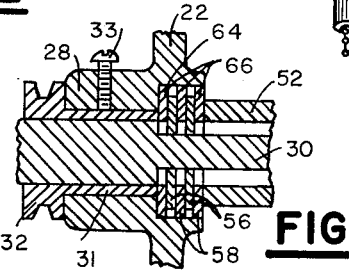
FIGURE 9 is an enlarged view of the slip clutch arrangement of the invention as taken along the line 9—9 of FIGURE 4.

In order for the device to function properly, a means must be provided for rewinding the cable 12B into the truck when tension is released on it, that is, tension must at all times be imposed on the measuring cables 12A and 12B to assure that the length of the cables extending from the truck is an accurate indication of the distance of the corners of the truck from the point where the ends of the cables are attached. This is accomplished by means of an electric motor 44 having dual output shafts 46A and 46B. Output shafts 46A and 46B connect by means of shaft connectors 48 with pulley shafts 30. The opposite end of pulley shaft 30 is rotatably supported in a bushing 52 which in turn is supported by a bearing collar 54 to the housing 20. Supported about the pulley shaft 30 within a recess formed in the pulley hub 28 are a number of drive washers 56 and slip washers 58 positioned alternately to each other. The drive washers 56, as best shown in FIGURES 4 and 9 have a non-circular hole 60 to fit a flattened area 62 on the pulley shaft 30. Thus, the drive washers 56 are non-rotatably affixed to the pulley shaft 50 and rotate when the pulley shaft 50 is rotated, which in turn is rotated by motor 44.

Alternately spaced with the drive washers 56 are the slip washers 58 which have a cylindrical hole therein so that they are rotatable about the pulley shaft 30. Drive washers 56 are each provided with an integrally formed extending boss portion 64 which matches a notch 66 formed in the hub 28 so that the slip washers 58 are free to rotate about the pulley shaft 30 but are secured to hub 28.

The drive washers 56 and slip washers 58 are preferably constructed of some bearing type material such as phenolic plastic or bronze, and preferably the drive washers are composed of one material and the slip washers of the other of these two materials. The drive washers 56 and slip washers 58 provide a clutch arrangement. When shaft 46A and 46B are rotated by motor 44, through the clutch arrangement formed by drive washers 56 and slip washers 58, rotary torque is applied to the reels 22A and 22B to rotate them in a direction so as to pull cables 12A and 12B into the indicating panel 16. The amount of tension may be adjusted by a nut 68 threadably affixed to pulley shaft 30. As nut 68 is tightened against bushing 52 the drive washers 56 and slip washers 58 are forced with greater pressure against each other to increase the amount of rotary torque exerted against reels 22A and 22B as motor 44 rotates. A bearing washer 70 between the coupling 48 and counter drive sprocket 32 permits rotation of these two elements relative to each other.

Figure 3:
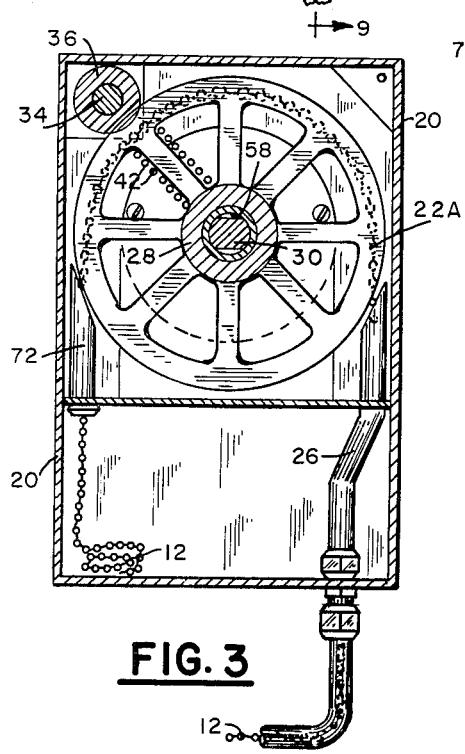
FIGURE 3 is a cross-sectional view taken along the line 3—3 of FIGURE 2.

As shown in FIGURE 3, the chain 12 drawn into the indicating panel 16 by the rotation of motor 44 loops around the reels 22A and 22B and passes through a receiving tube 72 and into the lower portion of the indicating panel 16 which serves to store the excess chain. It can be seen that an alternate embodiment would include the provision of take up means for drawing the received chain onto a reel.

When the spotter device as shown in FIGURES 1, 2, and 3 is not being used, all of the chain except that extending from the indicating panel 16 to the back of the truck will be withdrawn into the indicating panel. When the device is to be used, the truck is backed as close to the object 14 representing the desired rearward position as the driver can move the vehicle with ease. Cables 12A and 12B are then pulled from the truck. Pulling of cables 12A and 12B rotates reels 22A and 22B and thereby, through counter drive sprocket 32 and counter chain 42, the counters 18A and 18B, so that an increased number is shown on them. When cable is extracted from the truck the motor shaft 46B and the pulley shaft 30 remain stationary, with slippage occurring between the slip washers 58 and the drive washers 56. When the driver is ready to back the truck to the desired position, motor 44 is energized so that shafts 46A and 46B, and thereby the pulley shafts 30, are rotated applying frictional tension to the rotation of reels 22A and 22B. This tends to withdraw the cables 12A and 12B into the indicating panel so that as the truck is backed cables 12A and 12B are drawn taut. The tension applied by the rotation of motor 44 is slight, just a sufficient amount of applied tension to cables 12A and 12B. As the truck backs towards the object 14 to which cables 12A and 12B are affixed, the indicators 18A and 18B indicate the relative distance of each rearward corner of the truck from the object 14. As long as both of the numbers shown on indicators 18A and 18B are the same, the driver knows that he is proceeding directly to the object. When one rearward corner of the truck 10 is further from the desired object 14, an indication that the direction of the truck is not correct, then a larger number will show on one of the indicators 18A or 18B. Thus, by watching indicators 18A or 18B, the driver can manipulate the truck so as to back it precisely to the point desired. In addition, the numbers shown on the counters 18A and 18B indicate the distance of the truck from the object so that the driver can not only accurately direct the truck centrally towards an object, but can stop the truck at a specific predetermined distance from the object. When the desired rearward position is reached, the cables 12A and 12B may be removed from the object 14 and, with motor 44 energized to apply tension to the cables 12A and 12B, they will be withdrawn to the truck so as not to interfere in any way with the use of the truck.

Figure 7:
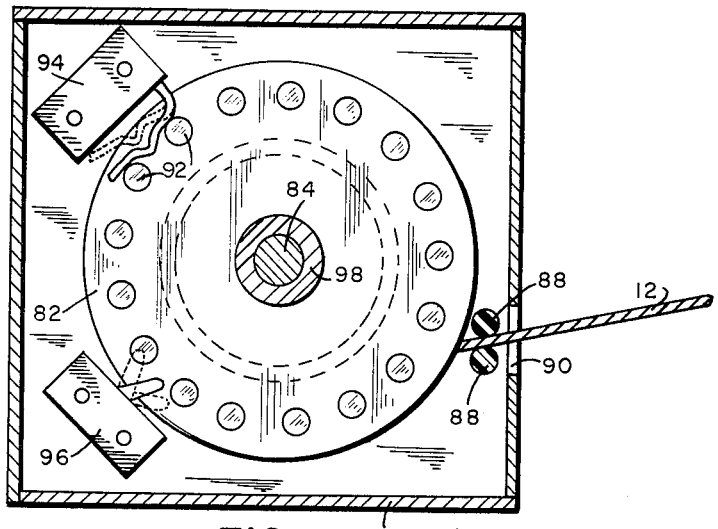
FIGURE 7 is a cross-sectional view taken along the line 7—7 of FIGURE 6 showing further details of the construction of the pulsing device.
Figure 6:
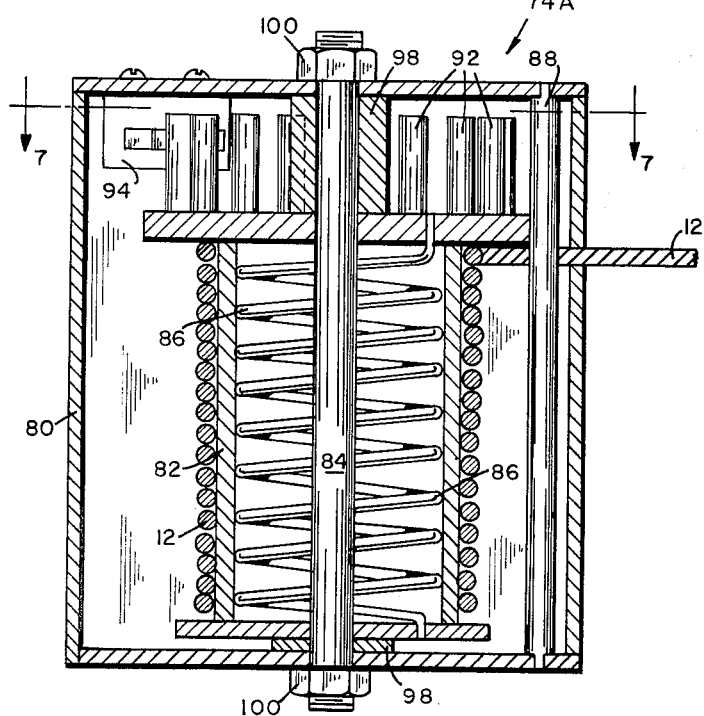
FIGURE 6 is a greatly enlarged cross-sectional view taken along the line 6—6 of FIGURE 5 showing the details of construction of a pulse generator as utilized in the invention.

FIGURES 5, 6, and 7 disclose an alternate embodiment of the device of this invention. As shown in FIGURE 5, the truck 10 is equipped with cable receiving means 74A and 74B at each rearward corner from which cables 12A and 12B extend to an object 14 as was described with reference to FIGURE 1. Positioned in the cab of the truck 10 in ready view of the operator are two electric pulse counters 76A and 76B. Extending from cable receiving means 74A to pulse counter 76A is a conductor 78A and likewise a conductor 78B connects the cable receiving means 74B with pulse counter 76B. Briefly, the device of FIGURE 5 functions the same as described for FIGURE 1 except that the distances cables 12A and 12B extend from the rearward corners of the truck 10 are measured by electrical pulses registered on counters 76A and 76B rather than by direct mechanical means. Referring to FIGURES 6 and 7, the means whereby the electrical pulses are generated in proportion to the length of cable extending from a truck is best shown.

FIGURE 6 discloses the cable receiving means 74A in cross-section, the cable receiving means 74B being identical. The cable receiving means 74A is provided with a base or cover 80 which serves as a superstructure for the device. A reel 82 is supported in the cover 80 by a shaft 84. A coil spring 86 within the reel 82 applies a torque to the reel in the same manner as a spring in a windowshade so that tension is always applied to constrain the cable 12 within the device and about the reel 82. Rollers 88 guide the cable 12 into and out of the cover 80 through an opening 90.

Extending from the reel 82 and parallel to the shaft 84 are a series of evenly spaced pins 92 which, as the reel rotates, trip a microswitch 94 so that as each pin 92 passes the switch 94 an electrical pulse is generated. By means of the conductors 78 as shown in FIGURE 5 the pulses are fed to pulse counters 76A and 76B so that a visual indication is given of the number of pulses generated which in turn is proportional to the length of cable 12 extracted from the cable receiving means.

In order for the device to function, it is important that as cable 12 is withdrawn from the truck that the numbers indicated by counters 76 increase, and as cable is wound into the receiving means numbers are substracted from the counters 76. This is accomplished by means of a direction switch 96 (see FIGURE 7) which is actuated by the direction in which the reel 82 turns so that when the reel is turning in the direction caused by the extraction of cable 12 direction switch 96 is switched to the add position, and when the reel 82 turns in the opposite direction as cable 12 is wound thereon, the switch 96 is switched to subtract position. A specific number on either of the counters 76A or 76B will also indicate a specific distance the cables have been extended from the truck.

Figure 8:
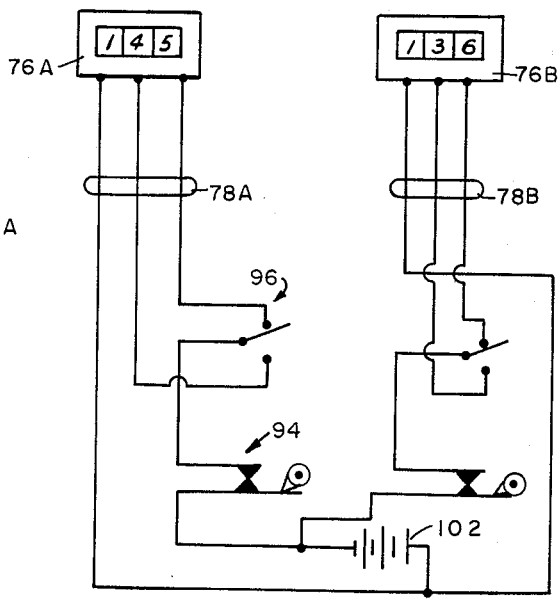
FIGURE 8 is wiring schematic of the alternate embodiment of the invention.

Spacers 98 holds the reel 82 in proper position within the cover 80. Nuts 100 affixed to each end of the shaft 84 hold the reel properly assembled. Referring to the schematic wiring diagram of FIGURE 8, the electrical arrangement of the alternate embodiment of the invention is shown. By the truck battery 102 electrical energy is supplied to the microswitch 94 which is pulsed by the pins 92 extending from the reels 82. The direction switch 96 is actuated to supply the pulses to counters 76A and 76B in an add or subtract manner according to the direction of rotation of the reels 82.

As has been previously stated, the operation of the electrical device set forth in FIGURES 5 through 8 is identical to that shown for the mechanical arrangement of the invention as set forth in FIGURES 1 through 4.

The spotter device of this invention functions, geometrically speaking, by providing two right triangles and giving to the driver information indicative of the length of the hypotenuse of each of the thus created right triangles. As shown in FIGURE 1, the back of the truck, or more particularly, an imaginary line between pulleys 24, forms the base of two triangles. Measuring cable 12A forms the hypotenuse of one triangle and measuring cable 12B forms the hypotenuse of the other triangle. The dotted line 104 is an imaginary line forming the common altitude of the two triangles. As long as the truck is proceeding directly toward the desired point 14, the two imaginary triangles are equal and this information is presented to the truck driver by the mechanism of the invention previously described. When the truck is not aligned to move directly toward the object 14, the triangles will be dissimilar and will have different hypotenuses, which information is likewise presented to the driver to permit him to correct the steering of the vehicle.

Although the invention has been described with a certain degree of particularity, it is manifest that many changes may be made in details of construction and the arrangement of components without departing from the spirit and scope of this disclosure.

What is claimed is:

1. A spotter device for a vehicle, said device adaptable for mounting in the cab of the vehicle to be viewed by the driver, comprising:
   a first reel means and a second reel means;
   a cable windably extending from each of said reel means, cable guide means mounted at each of the rear corners of the vehicle, one of said cables extending from said vehicle at substantially the right rear corner of said vehicle and the other of said cables extending from the left rear corner of said vehicle;
   rewind torque means affixed to each of said reel means to windably urge each of said cables onto said reels;
   and separate counter means actuated by each of said cables to indicate the length of each of said cables extending from said vehicle.

2. A spotter device according to claim 1 wherein said rewind torque means includes, an electric motor having a shaft extending therefrom, and slip clutch means independently coupling said shaft of said motor to each of said reel means.

3. A spotter device for use on a vehicle to enable the driver of the vehicle to accuartely back the vehicle to a predetermined location comprising:
   a first reel means rotatably supported on said vehicle at substantially the right rearward corner thereof;
   a second reel means rotatably supported on said vehicle at substantially the left rearward corner thereof;
   a separate cable means windably received onto and extending from each of said reel means;
   rewind torque means affixed to each of said reels to windably constrain each of said cables onto said reels;
   electric pulse generating means actuated by each of said reels adaptable to generate electrical pulses in proportion to the degree of rotation of said reels;
   and a first and second electric pulse counter means affixed within said vehicle within vision of the driver of said vehicle, said counters having electrical communication with said electric pulse generating means.

4. A spotter device according to claim 3 wherein said rewind torque means includes spring means.

5. A spotter device according to claim 3 including a double throw switch means supported adjacent each of said reel means and actuated by said reel means upon the change of direction of rotation of said reel means, each of said switches having electrical communication with said one of said pulse generating means and one of said pulse counter means, and wherein said electric pulse counter means are bidirectional counter means, the direction of counting of said electrical pulses of each of said counter means being determined by the said switch having communication therewith.

References Cited by the Examiner

UNITED STATES PATENTS

| 2,104,377 | 1/1938 | Prout | 33—86 |
| 2,387,647 | 10/1945 | Crosman | 33—224 |
| 2,479,723 | 8/1949 | Brown | 33—193 |
| 2,524,596 | 10/1950 | Kamp | 33—86 |
| 2,604,704 | 7/1952 | Woodward | 33—189 |

FOREIGN PATENTS

| 813,361 | 2/1937 | France. |

ROBERT B. HULL, *Primary Examiner.*